United States Patent [19]

Aubert

[11] 4,177,547

[45] Dec. 11, 1979

[54] METHOD OF MANUFACTURING CABLE CLIPS AND DEVICE FOR APPLYING THE METHOD

[75] Inventor: René Aubert, Pont A Mousson, France

[73] Assignee: Societe d'Usinage des Tubes pour l'Electricite S.U.T.E., Pont A Mousson, France

[21] Appl. No.: 880,521

[22] Filed: Feb. 23, 1978

[30] Foreign Application Priority Data

Feb. 25, 1977 [FR] France ................................ 77 05624

[51] Int. Cl.² ............................................. B23P 11/00
[52] U.S. Cl. ..................................... 29/432; 29/527.1;
264/294; 425/DIG. 34
[58] Field of Search ................... 29/432, 527.1, 564.1;
264/294, 328; 425/DIG. 34

[56] References Cited

U.S. PATENT DOCUMENTS

| 2,999,276 | 9/1961 | Morin ................................. 29/527.1 |
| 3,396,453 | 8/1968 | Thomas .............................. 29/527.1 |
| 3,458,931 | 8/1969 | Carlson et al. ..................... 29/527.1 |
| 3,703,759 | 11/1972 | Wayson et al. ..................... 29/527.1 |

Primary Examiner—Lowell A. Larson
Attorney, Agent, or Firm—Sughrue, Rothwell, Mion, Zinn and Macpeak

[57] ABSTRACT

The invention relates to an automatic method for obtaining directly a moulded finished product provided with nails, e.g. clips for tubes or electric cables. The method comprises successively at a first station an injection phase in a mould defined by a fixed half-mould and a movable half-mould, a transfer phase to a second station of the movable half-mould bearing the moulded clips, a phase in which said clips are provided with nails at said second station and a phase in which the moulded clips, provided with nails are ejected, the cycle of the phases being resumed after the transfer of the movable half-mould to said first station.

23 Claims, 16 Drawing Figures

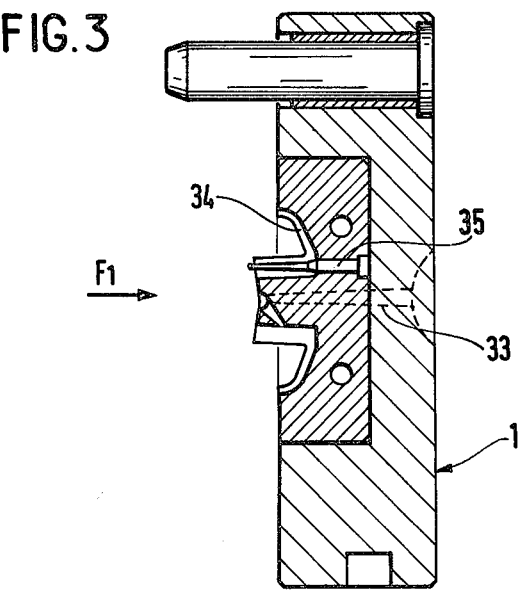
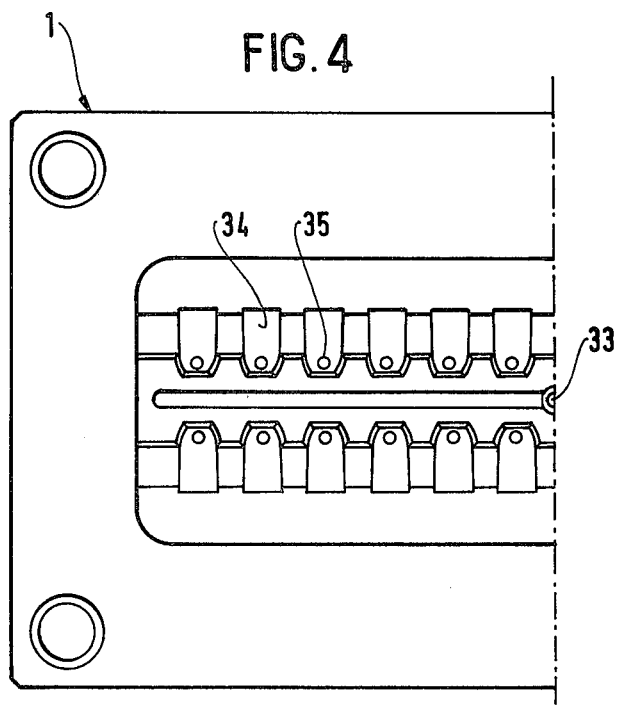

METHOD OF MANUFACTURING CABLE CLIPS AND DEVICE FOR APPLYING THE METHOD

FIELD OF THE INVENTION

The present invention relates to the automatic manufacture of clips for supporting tubes or electric cables on a surface, said clips having substantially the shape of a hook and being assembled with a fixing member for fixing the clip to the surface. The fixing member is generally a nail or a pin.

BACKGROUND OF THE INVENTION

Such clips are mass-produced and it is very important to reduce as much as possible the number and the duration of the manufacturing operations taking into account the low unit cost price. At present, manufacture usually comprises the following successive phases: moulding the clips on an injection press, receiving the parts together with the mould insert, taking up again the independent clips on a machine for providing nails, selecting and positioning the clips (for example by a vibrating bowl) and lastly inserting nails in the clips. Such a succession of operations, with unavoidable idle time due to manual operations by the operator, is incompatible with economical mass-production, not to speak of the problems inherent to the semi-finished products.

The invention aims to provide an entirely automatic method of manufacturing clips which does not have the disadvantages of present techniques and which make it possible to obtain directly the moulded finished product assembled with nails without having to pick up the product at some intermediate stage.

SUMMARY OF THE INVENTION

The method in accordance with the invention comprises successively a method of automatic manufacture of clips for supporting tubes or electric cables on a surface, said clips having substantially the shape of a hook and being assembled with a fixing member for fixing the clip to the surface. The method comprising successively: at a first station, an injection phase in a mould defined by a fixed half-mould and a movable half-mould; a phase in a second station during which the movable half-mould is transferred, carrying the moulded clips with it; a fixing member insertion phase for said clips at said second station; and an ejection phase of the assembled clips. The cycle of the phases are resumed after return of the movable half-mould to said first station.

The method can also have at least one of the following characteristics.

It comprises successively: an injection phase at the first station in a mould defined by a fixed half-mould and a first movable half-mould simultaneously with a phase in which the fixing members are inserted at the second station in the moulded clips carried by a second movable half-mould which is integral with said first movable half-mould; a phase at the second station in which the assembled clips are ejected; a transfer phase of the first movable half-mould to a third station identical to said second station and of the second movable half-mould to said first station; an injection phase at said first station in a mould defined by said fixed half-mould and said second movable half-mould simultaneously with a fixing member insertion phase at said third station for the moulded clips carried by said first movable half-mould; and an ejection phase at the third station of the assembled clips; the cycle of phases being resumed after return of said first movable half-mould to the first station and of the second movable half-mould to the second station.

In this case, it comprises the ejection at the second station of the assembled clips simultaneously with an ejection phase at the first station of a mould insert of the moulded clips carried by the first movable half-mould; and the ejection at the third station of the assembled clips simultaneously with an ejection phase at the first station of a mould insert of the moulded clips carried by the second movable half-mould.

Each fixing member insertion phase is preceded by selection, transfer and positioning phases of the fixing members for inserting said fixing members simultaneously during said insertion phase.

The phases for transfer and positioning the fixing members relate simultaneously to all of said fixing members.

The invention also relates to a device for performing the method comprising a mould defined by a fixed half-mould and a movable half-mould which can move transversally from a first station for injection to a second station for fixing member insertion, means which allow the simultaneous provision of fixing members for the moulded clips and means for ejecting the assembled clips.

The device can also have at least one of the following characteristics.

It comprises a first movable half-mould and a second movable half-mould which are identical, disposed integrally side by side and able to move transversally from a first position for which the first movable half-mould is at the first station for injection and the second movable half-mould is at the second station for fixing member insertion, to a second position for which said second movable half-mould is at the first station and said first movable half-mould is at a third station also for fixing member insertion which is identical to said second station.

It comprises means for ejecting the mould insert independently from the means for ejecting the assembled clips.

It comprises means for selecting, transferring and positioning the fixing members for the corresponding station for fixing member insertion.

The movable part of the mould is mounted for its transversal movement by sliding along a slider plate integral with the mobile press plate of the mould and is controlled automatically by at least one lateral hydraulic jack.

The fixing members are driven into the clips by closing movement of the press, by push jacks or by any other equivalent means.

The means for ejecting the assembled clips comprises push rods which pass through the movable portion of the mould and are controlled simultaneously, one push rod being assigned to each of said clips.

The means for ejecting the mould insert comprises push rods which pass through the movable portion of the mould and are controlled simultaneously, one push rod being provided at the center facing a central injection duct which passes through the fixed half-mould, and other rods being provided at least at each end of said mould insert.

The means for selecting the fixing members comprises at least one sliding plate provided with holes designed to accomodate said members, and supply means such as vibrating bowls which distribute the members as the plate slides. Said plate includes means for sideways expansion so as to release said members simultaneously. The sliding plate is arranged to release the members from two positions situated on either side of the supply means so as to be able to supply two fixing member insertion stations.

The transfer means comprises flexible tubes which allow each member to reach its positioning station with a view to be inserted in a moulded clip.

The selection means are disposed above and substantially vertical to the stations for positioning the fixing members and each flexible tube is disposed below the corresponding hole for a transfer of said members merely under gravity.

The means for positioning the fixing members comprises a cylinder rotatable about a substantially horizontal axis in a fixed cylinder bearing part. The cylinder has parallel holes which pass right through it designed to accomodate said fixing members so that the members will be directly disposed in their respective recesses in the vertical position, then after rotation of the cylinder through about 90°, in a substantially horizontal position for insertion of the fixing members in the clips. Then, the lower ends of the flexible tubes are substantially orthogonal to the means which drive the fixing members into the clips and both said lower ends and said means pass through the fixed cylinder bearing part.

Magnetized bars are also advantageously provided longitudinally inside the cylinder adjacent the holes therein which accomodate the fixing members with a view to maintaining said members in position during rotation of said cylinder.

An embodiment of the invention is described by way of example with reference to the accompanying drawings.

BRIEF DESCRIPTION OF THE DRAWINGS

FIG. 3 is a partial cross-sectional view along lines III—III of FIG. 1;

FIG. 4 is half of a front view along the plane F1 of FIG. 3;

DESCRIPTION OF THE PREFERRED EMBODIMENT

Figure 9:
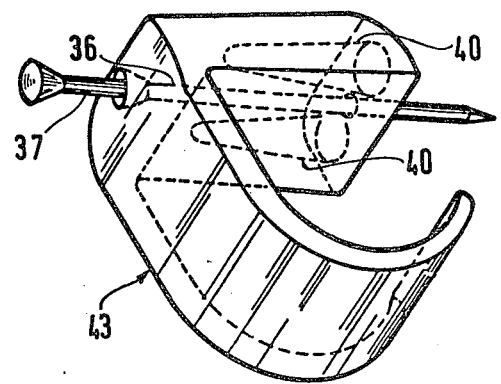
FIG. 9 illustrates in perspective an example of finished product directly obtained by the method in accordance with the invention.

The method in accordance with the invention is for the automatic production of clips for tubes or electric cables, these clips having substantially the shape of a hook and carrying a fixing member such as a nail for subsequent fixing of the clip to a surface; an example of such a clip is shown in FIG. 9. The fixing member will be designated hereinafter as a "nail" merely with a view to simplification and without any limiting character.

Figure 1:
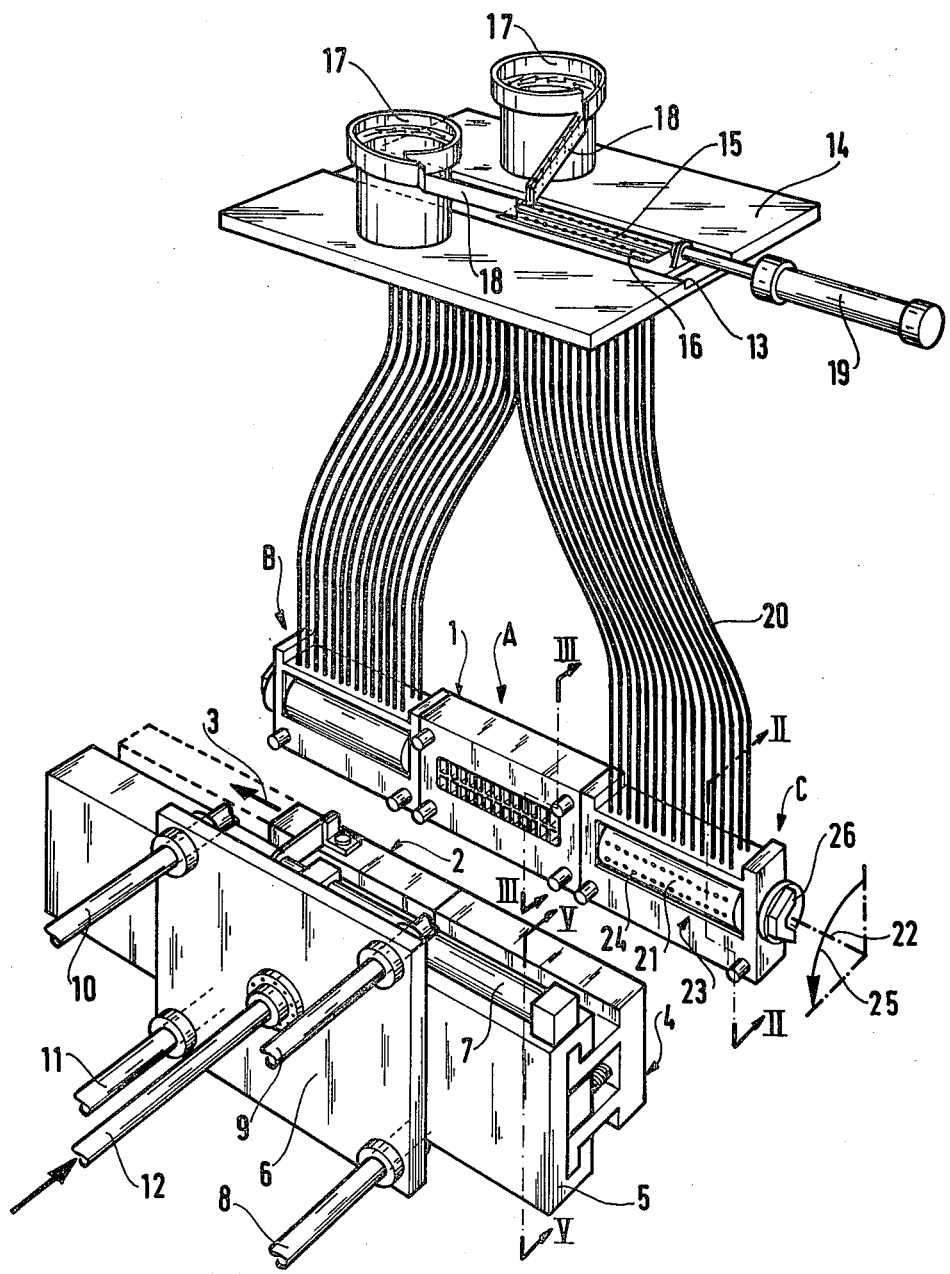
FIG. 1 is a general perspective view of a particular injection and nail insertion device in accordance with the invention.

The method according to the invention comprises successively an injection phase at a first station A, in a mould defined by a fixed half-mould 1 and a movable half-mould 2, a transfer phase in the direction of an arrow 3, FIG. 1, to a second station B of the movable half-mould 2 which carries the moulded clips, a nail-providing phase of said clips at said second station B and an ejection phase of the moulded clips provided with nails, the cycle of the phases being resumed after the movable half-mould 2 has returned to said first station A.

In accordance with this general definition, the method in accordance with the invention already constitutes an appreciable improvement over former production techniques, since the finished moulded product provided with nails is obtained directly. This method can be further improved, since the station A and B are used alternately according to the position of the movable half-mould, this entailing idle time for each station. Thus, according to a preferred embodiment of the invention which will be described in detail hereinafter, a third station C is provided which is identical to the station B together with a mould which is arranged so that there will always be two stations in operation, i.e. moulding at station A with nail-insertion at station B or moulding at station A and nail-insertion at station C.

FIG. 1 shows a particular preferred arrangement for the method according to the invention. This embodiment is particularly efficient because of masked time operation.

Generally, the method comprises in succession: two simultaneous phases of injection at the station A in a mould defined by the fixed half-mould 1 and a first movable half-mould 2 with a nail-insertion at the station C for moulded clips carried by a second movable half-mould 4 identical to, and integral with said first movable half-mould 2; an ejection phase at the station C for the moulded clips provided with nails; a transfer phase in the direction of the arrow 3 of the two movable half-moulds 2 and 4 respectively from station A to station B and from station C to station A; two simultaneous phases of injection at station A in a mould defined by the fixed half-mould 1 and the second movable half-mould 4 with nail-insertion at the station B for the moulded clips carried by the first movable half-mould 2; and an ejection phase at the station B for the moulded clips provided with nails. The cycle of these phases is resumed after the transfer of the movable half-moulds 2 and 4 respectively from the station B to the station A and from the station A to the station C.

The method with extra variants will be set forth hereinbelow with reference to the schematic FIGS. 7A to 7H which show more clearly the processes of the successive phases. However to simplify the explanation, a preferred embodiment of the device for performing the method in accordance with the invention will now be described.

In FIG. 1, the device comprises a fixed half-mould 1 and two identical movable half-moulds 2 and 4 which can move transversally from one position in which the stations A and B operate to a position in which the stations A and C operate. The movement of the movable portion 2 and 4 of the mould which slides along a slider back-plate 5 integral with a movable press plate 6 is controlled automatically by at least one lateral hydraulic jack 7 and advantageously by lateral jacks with double rods to allow the rest position to be checked. The movable press plate 6 moves longitudinally along guide bars 8, 9, 10 and 11 fixed to the frame of the device (see also FIG. 8), in a way known per se and the movement of said plate is controlled by a jack rod 12.

The device includes selection means, transfer means and means for positioning the nails for the corresponding nail-providing station, hence in this case for the two nail-providing positions B and C. Indeed, means must be provided which allow a large number of nails to be disposed in a position such that all the moulded clips which are not yet provided with nails can be provided with nails simultaneously. Thus, in FIG. 1 the selection means comprise a slideway 13 provided in a fixed plate 14 and in which there slides a nail-bearing plate 15 which includes a number of holes 16 designed to accommodate nails; supply means such as vibrating bowls 17 with chutes 18 distribute the nails on either side of said nail-bearing plate 15. The plate 15 is driven in a reciprocating movement by means of the rod of a jack 19; in front of the chutes, each hole takes a nail which remains suspended by its head so that the nail-bearing plate fitted with the set of nails intended for a nail-providing station releases said nails simultaneously by expanding sideways to allow the nail heads to pass. The nail transfer means are essentially constituted by flexible tubes 20 allowing each selected nail to reach its positioning station for nail-insertion into the clip. Thus, the nail-bearing plate 15 releases the nails corresponding to each of the two nail-providing stations B and C and to one of the two positions situated on either side of the supply means, each released nail reaching the inlet of the corresponding tube 20 to be guided to the positioning station for inserting the nails. The nail selection means are advantageously disposed higher than and substantially vertically above the positioning station corresponding to each nail-providing unit, so that the nails are simply transferred by gravity; auxiliary power is provided by a pneumatic pulse at the inlet of the tubes 20 with a view to facilitating the transfer of the nails.

The nail positioning means which constitutes a positioning station at the nail-providing stations B and C are identical for each nail-providing station: at the station C, for example, these means comprise a cylinder 21 rotatable about a substantially horizontal axis 22 in a fixed cylinder bearing component 23 and which has parallel recesses 24 which pass right through it and are intended to accomodate said nails, at a rate of one nail per recess. Thus, the nails passing through the tubes 20 drop into their recesses in the vertical position (position of the cylinder shown at the station B) and are then disposed in a substantially horizontal position for delivering the nails after rotation of said cylinder through about 90° in the direction of the arrow 25 (position of the cylinder shown at the station C); the means referenced 26 for controlling the rotation of the cylinder 21 in its cylinder bearer component are for example constituted by rotating jacks or any other equivalent means.

Figure 2:
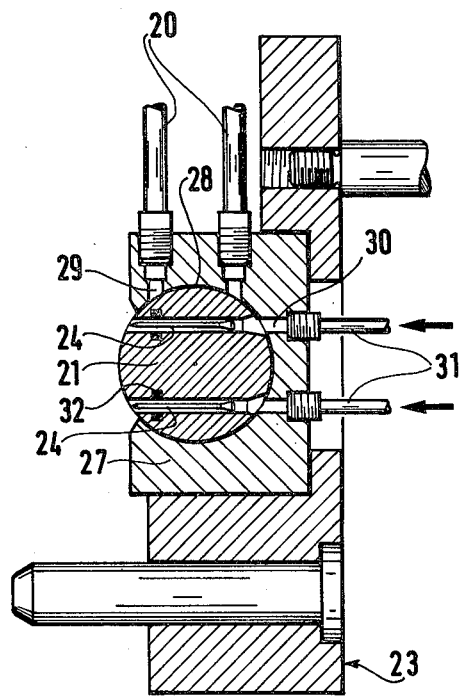
FIG. 2 is a partial cross-sectional view along lines II—II of FIG. 1.

In FIG. 2, the means for positioning the nails are shown more clearly: the fixed cylinder bearing component 23 is fitted with a fixed part 27 having a cylindrical recess 28 for accomodating the cylinder 21; upper vertical orifices 29 in which the lower ends of the tubes 20 arrive in alignment with the holes 24 when in the vertical position; and horizontal orifices 30 in which the means by which the nails are driven in arrive in the alignment of the recesses 24 in the horizontal position (as shown in FIG. 2). The nails can be driven in by pneumatic jacks (not shown) feeding tubes 31 which lead into each horizontal orifice 30, by the closing movement of the press or even by push jacks. Magnetic bars 32 which surrounds the holes 24 are advantageously provided inside the cylinder for proper maintenance of the nails in said holes when said cylinder moves.

FIGS. 3 and 4 show in detail the constitution of the fixed half-mould 1 with its injection duct 33, its female moulds 34 for two superposed rows of clips, and its rods 35 providing the core necessary for forming the nail-receiving hole in each clip (see FIG. 9, hole 36 for nail 37).

Figure 5:
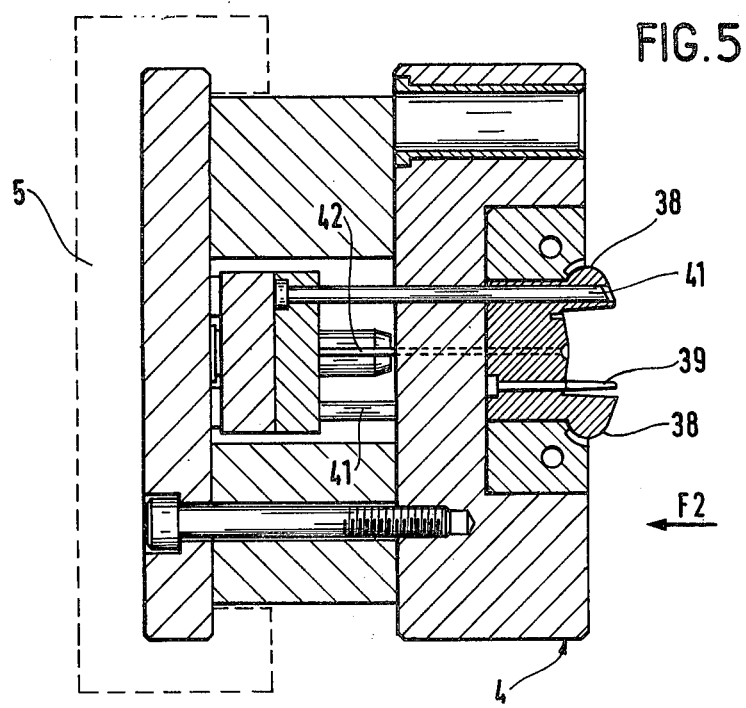
FIG. 5 is a partial cross-sectional view along lines V—V of FIG. 1.
Figure 6:
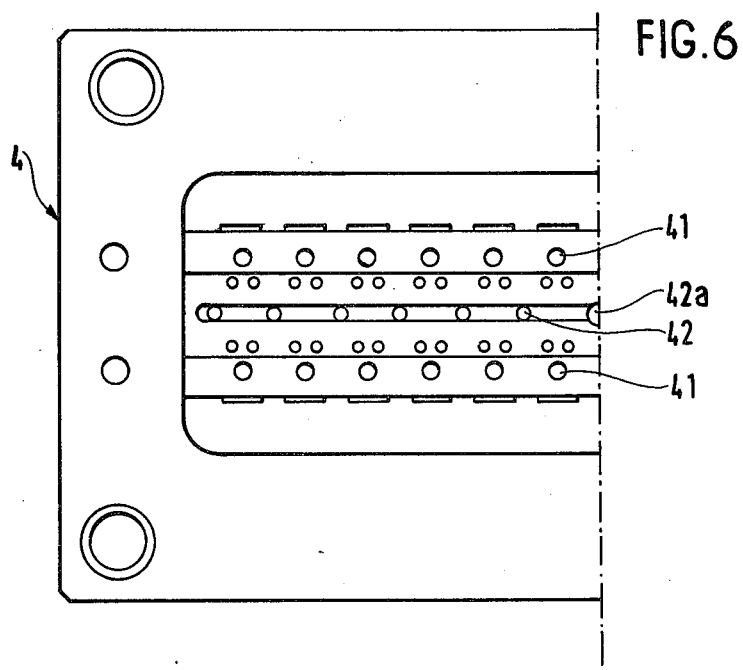
FIG. 6 is half of a front view along the plane F2 of FIG. 5.

FIGS. 5 and 6 show in detail the constitution of the movable half-mould 4 with the bars 38 which form cores and the rods 39 (two rods for each clip) which constitute the cores necessary for forming blind holes (40, FIG. 9) by which the creation of undesirable shrinkage holes on the finished product can be avoided.

Measures are naturally taken to dispose means for ejecting clips which are moulded provided with nails: these means comprise push rods 41 which pass through each movable half-mould and are controlled simultaneously, one push rod being assigned to each of said clips. It should be observed that the cross-section of FIG. 5 is purposely shifted at the horizontal plane of symmetry and that the push rod 41 is shown recessed in relation to its rest position in order to illustrate more clearly the part concerned.

In accordance with the invention, means are provided for ejecting the mould insert independently from the clips which are still borne by the movable portion of the mould; as will appear subsequently from the description of the method with reference to FIGS. 7A to 7H, the mould insert can thus be ejected at the station A, whereas the moulded clips provided with nails are ejected at the stations B and C, this eliminating further manual sorting operations. The ejection means for the mould insert comprises push rods 42 which pass through each movable half-mould and are controlled simultaneously, one push rod 42a being provided at the center facing the central injection duct, and passing through the fixed half-mould together with rods at least at each end of said mould insert: here, six push rods 42 are provided on each side of the central push rod 42a.

Figure 8:
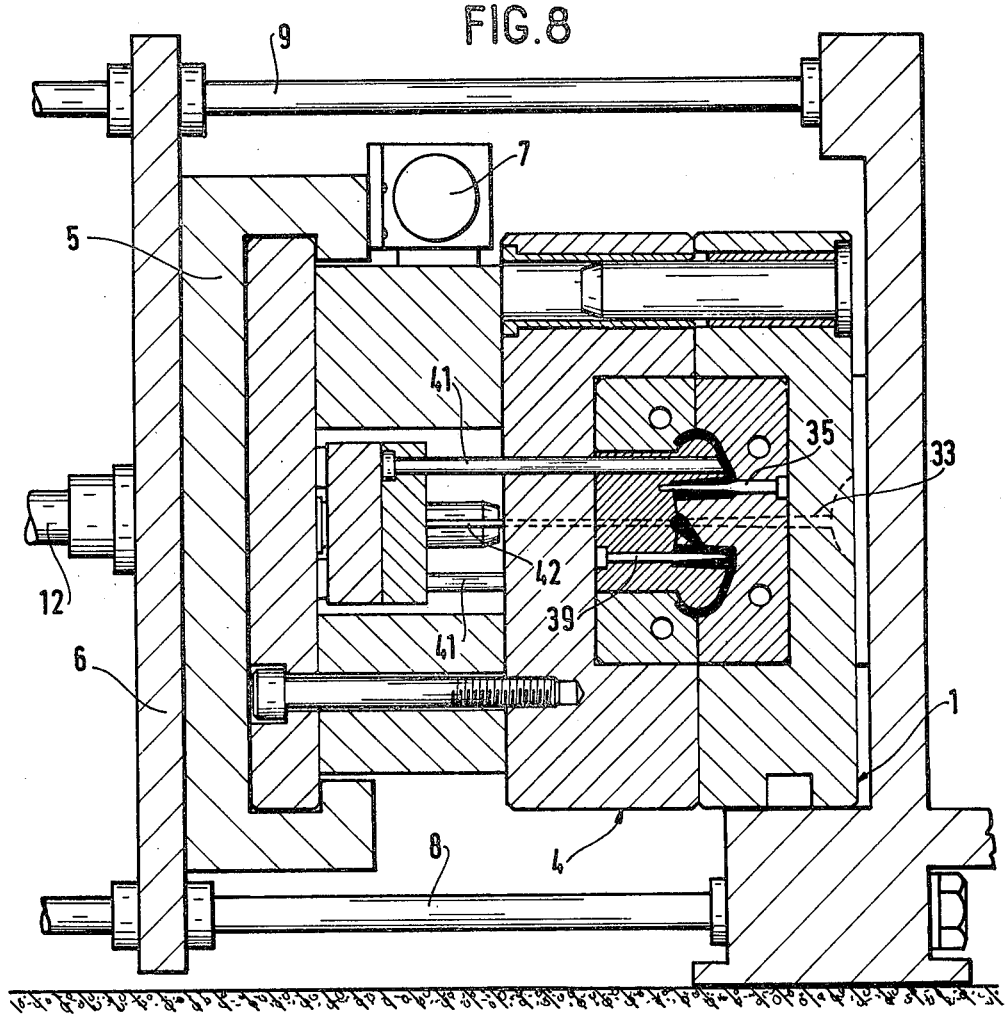
FIG. 8 is a cross-section of the mould according to FIGS. 3 and 5 at the time of injection.

FIG. 8 shows a detail of a cross-section of the complete mould at the time of injection, the press being closed. FIG. 9 is a perspective view of an example of a clip 43 produced directly by the automatic method of the invention.

After the complete description of the automatic injection and nail-providing device, the phases of the method will easily be understood with reference to FIGS. 7A to 7H, which are detailed views of the work at the injection station A and at the nail-injection stations B and C.

Figure 7A:
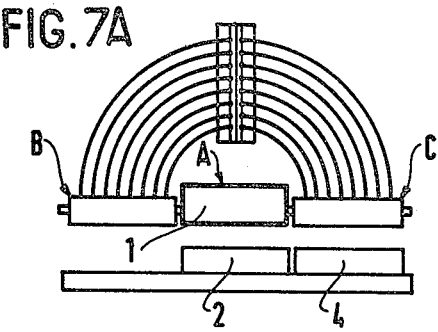
FIGS. 7A to 7H show schematically the successive phases of the method in accordance with the invention by means of a device according to FIG. 1.

FIG. 7A relates to the beginning of manufacture: the press is open and the movable half-mould 2 is at the station A ready for the injection phase.

Figure 7E:
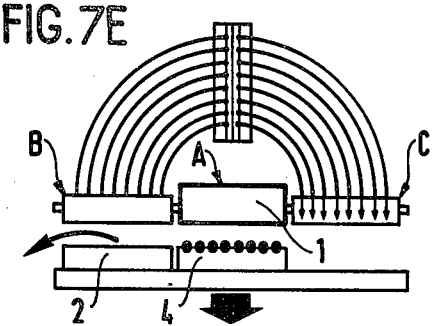
Figure 7B:
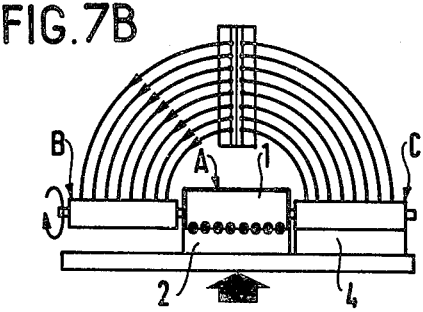

In FIG. 7B, the press is closed and injection takes place in the mould halves 1, 2; simultaneously, selection then transfer and lastly positioning of the nails take place at the station B.

Figure 7F:
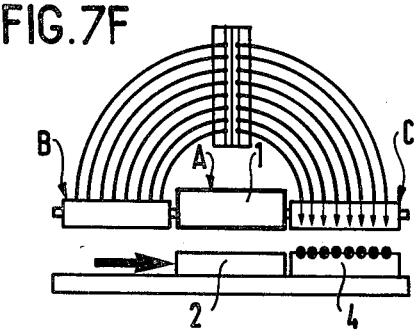
Figure 7C:
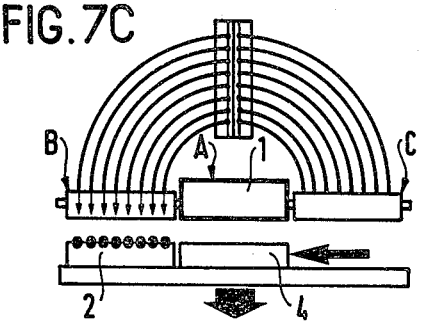

In FIG. 7C, after a stationary period which follows the end of injection, the press is opened and the movable part of the mould is transferred, the half-mould 2 which carries the moulded clips then being transferred to the station B. It is advantageous to provide an ejection phase for the mould insert just after the press has opened, while the movable half-mould 2 is still at the station A.

Figure 7G:
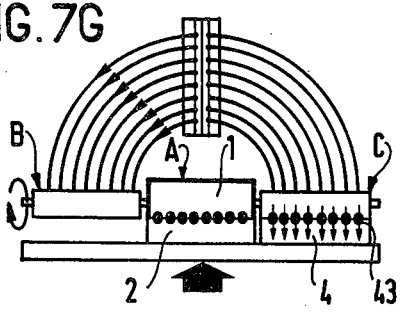
Figure 7D:
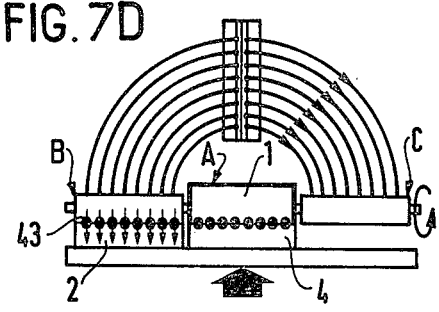

In FIG. 7D, the press is closed: there is a nail-insertion at the station B for the moulded clips of the movable half-mould 2 simultaneously with an injection phase at the station A for the mould halves 1, 4 and a selection, transfer and positioning of the nails phase for the station C.

In FIG. 7E, the press is open: the moulded clips provided with nails are ejected from the station B and the mould insert is ejected at the station A.

In FIG. 7F, the movable part of the mould is transferred, the movable half-mould 4 which carries the moulded clips then being transferred to the station C.

In FIG. 7G, the press is closed: there is a nail-providing phase at the station C for the moulded clips of the movable half-mould 4 simultaneously to an injection phase at the station A for the mould halves 1 and 2 and a selection, transfer and positioning of the nails phase at the station B.

Figure 7H:
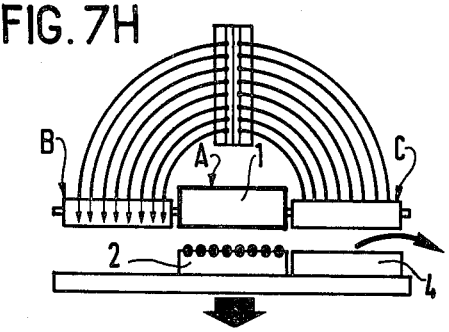

In FIG. 7H, the press is open: the moulded clips provided with nails are ejected from the station C and the mould insert is ejected at the station A; the method continues automatically from 7B for new cycles.

There exists naturally a number of safety devices which it has not been considered useful to illustrate, which prevent the mould from being closed in the case of an emergency: for example improper positioning of the movable part of the mould, the presence of residual nails which are improperly positioned or not ejected in the impressions, or a defective rotation of the cylinder; generally, a phase cannot be started until a signal indicates that the preceding phase is effectively ended and that the components are in place for the new phase to be carried out properly.

As will have appeared from the description, the invention has numerous advantages. We mention for reference the direct and completely automatic obtention of the finished product, the interchangeability of the mould with a view to different sizes and/or types of clips, as well as positioning nails at any moment of the injection-cooling cycle and the increase of cooling time by the decrease of the cycle time.

It is self-evident that the present invention is not limited to the examples which have been given thereof by way of illustration, but comprises any variant with equivalent means to the general definition of the invention such as claimed.

What is claimed is:

1. A method of automatic manufacture of clips for supporting tubes or electric cables on a surface, said clips having substantially the shape of a hook and being assembled with a fixing member for fixing the clip to the surface; the method comprising successively: at a first station, an injection phase in a mould defined by a fixed half-mould and a movable half-mould; a transfer phase at a second station during which the movable half-mould is transferred, carrying the moulded clips with it; a fixing member insertion phase for said clips at said second station; and an ejection phase of the assembled clips and wherein; the cycle of the phases resume after return of the movable half-mould to said first station.

2. A method according to claim 1, comprising successively: an injection phase at the first station in a mould defined by a fixed half-mould and a first movable half-mould simultaneously with a phase in which the fixing members are inserted at the second station in the moulded clips carried by a second movable half-mould which is integral with said first movable half-mould; a phase at the second station in which the assembled clips are ejected; a transfer phase of the first movable half-mould to a third station identical to said second station and of the second movable half-mould to said first station; an injection phase at said first station in a mould defined by said fixed half-mould and said second movable half-mould simultaneously with a fixing member insertion phase at said third station for the moulded clips carried by said first movable half-mould; and an ejection phase at the third station of the assembled clips and wherein; the cycle of phases are resumed after return of said first movable half-mould to the first station and of the second movable half-mould to the second station.

3. A method according to claim 2, comprising the ejection phase at the second station of the assembled clips simultaneously with an ejection phase at the first station of a mould insert of the moulded clips carried by the first movable half-mould; and an ejection phase at the third station of the assembled clips simultaneously with an ejection phase at the first station of a mould insert of the moulded clips carried by the second movable half-mould.

4. A method according to claim 1, wherein each fixing member insertion phase is preceded by selection, transfer and positioning phases of the fixing members for inserting said fixing members simultaneously during said insertion phase.

5. A method according to claim 4, wherein the phases for transfer and positioning of the fixing members involve simultaneously all of said fixing members.

6. A method according to claim 1 wherein said fixing members are nails.

7. A device for the manufacture of clips for supporting tubes or electric cables on a surface, said clips having substantially the shape of a hook and being assembled with a fixing member for fixing the clip to the surface and being manufactured by a method comprising successively: at a first station, an injection phase in a mould defined by a fixed half-mould and a movable half-mould, a transfer phase at a second station during which the movable half-mould is transferred, carrying the moulded clips with it; a fixing member insertion phase for said clips at said second station; and an ejection phase of the assembled clips; and wherein the cycle of the phases resumes after return of the movable half-mould to said first station, said device comprising: a mould defined by a fixed half mould and at least one movable half-mould, said device further comprising means for moving said at least one movable half-mould transversely from said first station for injection to said second station for fixing member insertion, means for allowing the simultaneous provision of fixing members for the moulded clips, and means for ejecting the assembled clips.

8. A device according to claim 7, wherein said at least one movable half-mould comprises a first movable half-mould and a second identical movable half-mould, said first and second half-moulds being disposed integrally side by side for movement transversally from a first position with said first movable half-mould at said first station for injection and said second movable half-mould at said second station for fixing member insertion to a second position in which said second movable half-mould is at said first station and said first movable half-mould is at a third station also for fixing member insertion with said first station being identical to said second station.

9. A device according to claim 7, wherein said mould comprises a mobile press plate, said press plate includes integrally a slider plate for mounting the movable part of the mould for its transversal movement and at least one lateral hydraulic jack for controlling automatically movement of said movable part of said mould.

10. A device according to claim 7, wherein the fixing members are driven into the clips by the closing movement of the press.

11. A device according to claim 7, wherein the fixing members are driven into the clips by push jacks.

12. A device according to claim 7, wherein the means for ejecting the assembled clips comprises push rods which pass through the movable portion of the mould and are controlled simultaneously, one push rod being assigned to each of said clips.

13. A device according to claim 7, wherein said at least one movable half-mould carries a mould insert, and said device further comprises means for ejecting the mould insert independently from the means for ejecting the assembled clips.

14. A device according to claim 13, wherein the means for ejecting the mould insert comprises push rods which pass through the movable portion of the mould and are controlled simultaneously, one push rod provided at the centre facing a central injection duct which passes through the fixed half-mould, and other push rods being provided at least at each end of said mould insert.

15. A device according to claim 7, comprising means for selecting, transferring and positioning the fixing members for the corresponding station for fixing member insertion.

16. A device according to claim 15, wherein the means for selecting the fixing members comprises at least one sliding plate provided with holes designed to accomodate said members, and supply means such as vibrating bowls which distribute the members as the plate slides, said plate including means for sideways expansion so as to release said members simultaneously.

17. A device according to claim 16, wherein the sliding plate is arranged to release the members from two positions situated on either side of the supply means so as to be able to supply two fixing member insertion stations.

18. A device according to claim 15, wherein the transfer means comprises flexible tubes which allow each member to reach its positioning station with a view to being inserted in a moulded clip.

19. A device according to claim 18, wherein the selection means are disposed above and substantially vertical to the stations for positioning the fixing members and that each flexible tube is disposed below the corresponding hole for a transfer of said members merely under gravity.

20. A device according to claim 19, wherein the means for positioning the fixing members comprises a cylinder rotatable about a substantially horizontal axis in a fixed cylinder bearing part and which cylinder has parallel holes which pass right through it designed to accomodate said fixing members so that the members will be directly disposed in their respective recesses in the vertical position, then after rotation of the cylinder through about 90°, in a substantially horizontal position for insertion of the fixing members in the clips.

21. A device according to claim 20, wherein the lower ends of the flexible tubes are substantially orthogonal to the means which drive the fixing members into the clips and both the said lower ends and the said means pass through the fixed cylinder bearing part.

22. A device according to claim 20, wherein magnetized bars are provided longitudinally inside the cylinder adjacent the holes therein which accomodate the fixing members with a view to maintaining said members in position during rotation of said cylinder.

23. A device according to claim 7, wherein said fixing members are nails.

* * * * *